(12) United States Patent
Shah et al.

(10) Patent No.: US 10,812,632 B2
(45) Date of Patent: Oct. 20, 2020

(54) NETWORK INTERFACE CONTROLLER WITH INTEGRATED NETWORK FLOW PROCESSING

(71) Applicant: AVAGO TECHNOLOGIES INTERNATIONAL SALES PTE. LIMITED

(72) Inventors: Hemal Vinodchandra Shah, Trabuco Canyon, CA (US); Karen Marie Schramm, Needham, MA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 212 days.

(21) Appl. No.: 14/753,528

(22) Filed: Jun. 29, 2015

(65) Prior Publication Data
US 2016/0232019 A1   Aug. 11, 2016

Related U.S. Application Data

(60) Provisional application No. 62/114,047, filed on Feb. 9, 2015, provisional application No. 62/175,574, filed on Jun. 15, 2015.

(51) Int. Cl.
*H04L 29/06* (2006.01)
*G06F 9/455* (2018.01)

(52) U.S. Cl.
CPC .......... *H04L 69/22* (2013.01); *G06F 9/45558* (2013.01); *G06F 2009/45595* (2013.01)

(58) Field of Classification Search
CPC ....... G06F 2009/45595; G06F 9/45558; H04L 49/354; H04L 69/22

(Continued)

(56) References Cited

U.S. PATENT DOCUMENTS 8,559,332 B2 * 10/2013 Yanggratoke ......... H04L 43/026
                                                        370/253
8,774,213 B2 *  7/2014 Vincent ............... H04L 12/4633
                                                        370/235

(Continued)

OTHER PUBLICATIONS

Niranjan Mysore et al. "FasTrak: enabling express lanes in multi-tenant data centers." Proceedings of the ninth ACM conference on Emerging networking experiments and technologies. ACM, 2013. pp. 139-150.*

*Primary Examiner* — Meng Ai T An
*Assistant Examiner* — Willy W Huaracha
(74) *Attorney, Agent, or Firm* — Xsensus LLP

(57) ABSTRACT

A system includes network interface controller (NIC) and a host processor. The host processor may run a hypervisor or OS which may manage virtual network activity for virtual machines (VMs) and/or applications. The NIC may provide a physical function to the hypervisor to support network activity by the VMs and/or applications. Some VMs and/or applications on the network may bypass the hypervisor and access virtual functions from the NIC. The NIC may execute a configurable flow analyzer (CFA), which may perform flow processing operations on the network traffic. The CFA may access flow configuration and management parameters maintained by the hypervisor to control implementation of the flow processing operations. Performing the flow processing operations on the traffic for the VMs and/or applications bypassing the hypervisor or OS may extend management by the hypervisor or OS to these VMs and/or applications.

11 Claims, 8 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 8,930,690 | B2* | 1/2015 | Zuo | H04L 47/20 |
| | | | | 713/162 |
| 9,021,475 | B2* | 4/2015 | Nimmagadda | G06F 9/5077 |
| | | | | 718/1 |
| 9,092,269 | B2* | 7/2015 | Kandula | G06F 9/5077 |
| 9,692,698 | B2* | 6/2017 | Cherian | H04L 45/745 |
| 2007/0098010 | A1* | 5/2007 | Dube | G06F 9/5044 |
| | | | | 370/463 |
| 2011/0320632 | A1* | 12/2011 | Karino | H04L 49/30 |
| | | | | 709/238 |
| 2012/0079478 | A1* | 3/2012 | Galles | H04L 47/2441 |
| | | | | 718/1 |
| 2012/0124572 | A1* | 5/2012 | Cunningham | G06F 9/45558 |
| | | | | 718/1 |
| 2015/0029853 | A1* | 1/2015 | Raindel | H04L 47/127 |
| | | | | 370/235 |
| 2015/0172169 | A1* | 6/2015 | DeCusatis | H04L 47/12 |
| | | | | 718/1 |
| 2015/0370586 | A1* | 12/2015 | Cooper | G06F 9/45533 |
| | | | | 710/308 |
| 2018/0212869 | A1* | 7/2018 | Wu | H04L 69/22 |

\* cited by examiner

NETWORK INTERFACE CONTROLLER WITH INTEGRATED NETWORK FLOW PROCESSING

PRIORITY CLAIM

This application claims priority to provisional application Ser. No. 62/175,574, filed Jun. 15, 2015, and to provisional application Ser. No. 62/114,047, filed Feb. 9, 2015, which are entirely incorporated by reference.

TECHNICAL FIELD

This disclosure relates physical and virtual networking. This disclosure also relates to network flow processing for physical, virtual, and software defined network switches.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in packet flow processing and network flow table management, will further enhance performance of data networks.

DETAILED DESCRIPTION

Figure 1:
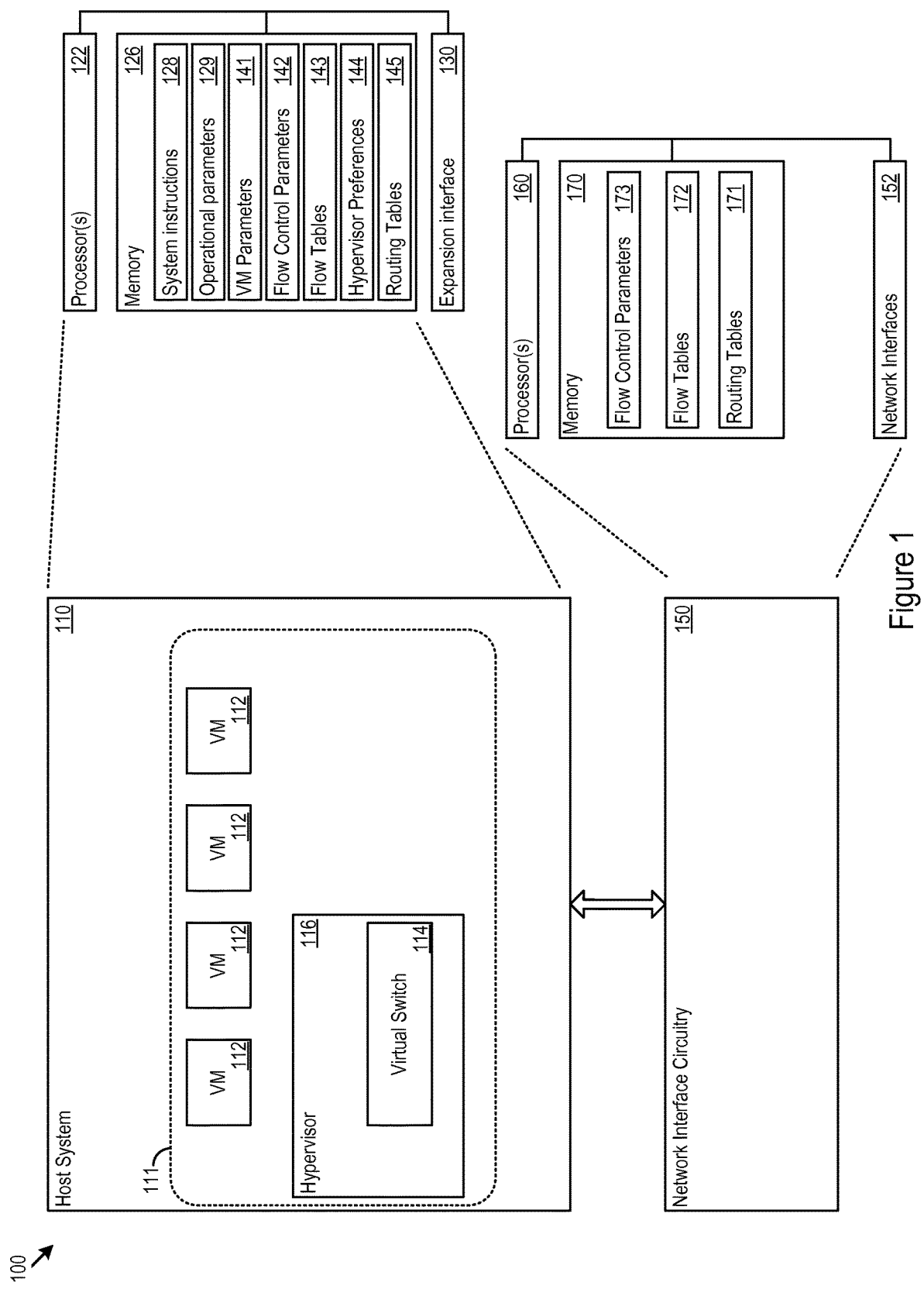
FIG. 1 shows an example virtual machine (VM) environment.

The discussion below describes techniques and architectures preforming network flow processing at network interface circuitry (NIC), such as network interface controllers, physical switches, or other network resource circuitry capable of providing network connectivity to physical machines, virtual machines, virtual switches, or other network entities. The NIC may perform flow processing operations on virtual functions that may bypass a virtual switch or hypervisor, as examples. Virtual functions may include network port assignments/connectivity, switching, routing, traffic forwarding, or any other network functions. Additionally or alternatively, the NIC may perform flow processing operations on any function thereby offloading the one or more flow processing functions from the virtual switch and/or hypervisor and reducing the processing load of the host processor(s) of the virtual network environment.

In various implementations, the NIC may provide physical functions to a virtual switch to support, for instance, the provision of network resources to virtual machines managed by the virtual switch. The virtual switch may manage the virtual machines in accord with flow configuration parameters stored in memory allocated to the virtual switch. The NIC may provide virtual functions to virtual machines thereby bypassing the virtual switch. The virtual functions may implement one or more protocols to support network resource provision to the virtual machines. Virtual functions may include virtualized versions of physical function resources. For example, PCIe connectivity through a physical function may be virtualized such that multiple VMs may access a device on an expansion interface as multiple individual virtual interface using portions of the physical expansion interface's capabilities. A physical function may include full functional interaction with the device on an expansion interface. Network resources, may include network port access, network traffic reception, network traffic transmission, or access to other network activities. For example, a virtual function may be provided using a single-root input/output virtualization (SR-IOV) protocol. The SR-IOV mechanism may be used to extend peripheral component interconnect express (PCIe) connectivity to virtual machines while bypassing a virtual switch interface. In some cases, virtualized PCIe connectivity and/or other virtual functions may lack functionality present for corresponding physical functions. For example, a virtual function that bypasses virtual switch or hypervisor may lack packet flow processing capabilities available in virtual switch or hypervisor that is accessing and managing physical functions. The NIC may provide flow processing capabilities to the virtual functions. Further, in some cases, the NIC may access flow configuration and management parameters stored at a virtual switch or hypervisor and apply the flow configuration and management parameters to virtual functions that bypass the virtual switch and/or hypervisor, thereby extending the management domain of the virtual switch and/or hypervisor.

In various systems, the NIC may offload one or more flow processing functions from the hypervisor and/or virtual switch. The offloading may reduce the processing load of a host processor on which the virtual switch and/or hypervisor may execute. In an example scenario, a virtual switch may provide network connectivity to one or more virtual machines. The virtual switch may manage flow processing operations for the virtual machines and connect the virtual machines to the network via physical functions of the NIC. Rather than performing the managed flow processing functions at the virtual switch, the NIC may access flow configuration and management parameters for the flow processing functions and offload these operations from the virtual switch. In some cases, the NIC may also perform flow processing functions for virtual functions that bypass the virtual switch. Thus, the flow configuration and management parameters may be used to guide offloaded flow processing functions and flow processing functions for virtual functions that bypass the virtual switch.

FIG. 1 shows an example virtual machine (VM) environment 100. In the example virtual machine environment 100, a host system 110 may establish and support a virtual network 111, or a portion thereof, including one or more virtual machines 112, virtual switches 114, or hypervisors 116. The host system 110 may include one or more processors 122 to support execution of the virtual network 111. The host system may include memory 126 for execution support and storage of system instructions 128 and operational parameters 129. The instructions 128 and operational parameters may be implemented to control one or more expansion interfaces 130 of the host system. For example, the host system may include a PCIe bus able to support one or more peripheral components, such as network interface cards or other network interface circuitry. The memory 126 may further include virtual machine parameters 141, flow configuration and management parameters 142, flow tables 143, hypervisor preferences 144, routing tables 145 or other parameters. The expansion interfaces 130 may provide data connectivity between the host system and a NIC 150. For example, expansion interfaces may include PCI, PCIe, universal serial bus controllers, industry standard architecture (ISA) slots, advanced graphics ports (AGP) or other peripheral interconnects.

In some cases, a host system 110 may not necessarily include a hypervisor. In some such cases, a virtual switch may provide connectivity to applications, which may be positioned in the stack in place of the hypervisor, from within the operating system (OS) kernel. In other cases, a virtual switch may operate outside the OS kernel.

The NIC 150 may include network interfaces 152, such as ethernet (802.3 family), Wi-Fi (802.11 family), cellular (LTE/LTE-A, 3G, or other cellular), optical, Bluetooth, or other data connectivity. The NIC 150 may include one or more processors 160 to support execution of flow processing, network routing, offloading functions, virtual functions, physical functions, and/or other activities. One or more processors may be coupled to memory 170 and the network interfaces 152. The memory 170 may store routing tables 171, flow tables 172, flow configuration and management parameters 173, and other networking parameters.

In various implementations, the host system 110 may support multiple applications and/or VMs. The host system 110 may contain multiple virtual end stations (e.g., the VMs) that participate in a local area network (LAN). The VMs, for instance, may send traffic to each other and may belong to common multicast groups. The hypervisor 116, may provide a software layer allowing (among other functionality) multiple VMs to share a single physical NIC, and may handle sending network data, e.g., frames or packets, frames between VMs and replicating frames to multiple VMs. In order to support multiple queues, network port partitioning, network tunneling protocols, SR-IOV, Software Defined Networking (SDN), and Virtual Switch Acceleration (VSA), the NIC 150 may perform selected tasks for network flow processing.

In various implementations the NIC 150 may support integrated flow processing. To support integrated flow processing, the NIC may execute an integrated flow processing engine, or configurable flow analyzer (CFA). Through execution of the CFA, the NIC 150 may provide hardware-assisted processing of specific traffic flows to the host system 110.

The NIC 150 may perform virtualization offloads to support features that may be used with or without SR-IOV functionality. In some cases, the NIC 150 may support a host system 110 using an operating system (OS), such as Linux. The NIC 150 may provide hardware support for multiple queues managed by the OS and network virtualization (e.g., tunneling protocols or other virtualization operations). Flow processing at the NIC 150 may be used to identify a particular virtual entity (e.g., VM, virtual switch, virtual port, or other virtualized device) and an associated policy. The NIC, through a CFA, may then perform flow identification of the virtual entity to determine a policy for execution. However, various portions of the identification and execution process may be assigned to the host or offloaded by the NIC 150. For example, NIC 150 may perform virtual entity identification and policy lookup (e.g., via flow tables, routing tables and/or other data listings), and send the identities to the host system 110 for further processing. In another example, the host system 110 may perform identification and send the identities to the NIC 150 for offloading of the policy execution.

In various OSs, such as Linux the hypervisor may receive advertisements for multiple traffic queues. However, a single queue may be provided. The hypervisor may generate a policy (e.g., a set of rules) that may be used to assign incoming packets to a particular queue or ring. OSs and hypervisors may use different or similar queuing types (e.g. NDIS Virtual Machine Queues (VMQ), VMware Net-Queues, and/or other queue types). The different queue types may interoperate because the functionality between different queue types may be similar at the hardware layer. For example, traffic flows may be identified using the destination MAC address and/or optional VLAN ID, or other network parameter. The identification may be used to select a specific ring or a set of rings (e.g., using receive side scaling (RSS)).

A NIC executing a CFA may allow for larger destination MAC address (DMAC) and virtual LAN (VLAN) tables. The CFA may support various combinations of outer DMACs, Outer VLANs, Inner DMACs, and Inner VLANs identifiers, outer and inner layer 3 IP header fields, outer and inner layer 4 transport (e.g. TCP/UDP) header fields to select polices for a virtual entity. For example, in a network virtualization using generic routing encapsulation (NVGRE), inner DMACs and VLANs may be used for identification of virtual entities. The CFA may further implement header editing. For example, the CFA may execute a header encapsulation, header deletion, or other action on a tunnel header (e.g. in a virtual extensible LAN (VXLAN) tunnel).

The CFA may be instructed by the hypervisor or host virtual switch to insert a VLAN tag in a packet submitted for transmission or remove a VLAN tag from a received packet. On the transmit path, the virtual switch may communicate a VLAN tag for insertion along with the packet descriptor. Additionally or alternatively, the virtual switch may identify an action record for VLAN tag insertion in the packet descriptor. On the receive path, a removed VLAN tag may be communicated from the NIC out-of-band (OOB) along with the received packet.

In various operational modes, e.g., promiscuous modes or unfiltered modes, the CFA may support reception of packets on a network port without packet filtering. Additionally or alternatively, the CFA may support reception of specific types of traffic (unicast, broadcast, or multicast), traffic for a specific flow, or specific VLAN traffic received promiscuously by promiscuous virtual entity.

The CFA may perform mirroring or copying of packets to a specific mirrored virtual entity. In some cases, the mirroring may be specified by a hypervisor, virtual switch or other entity on per rule or per flow basis. This specificity allows mirroring to be specified based on origin, destination, or flow, (e.g., for all traffic, traffic for a specific flow, specific VLAN traffic, specific virtual entity traffic, and/or other traffic classifications) Additionally or alternatively, the mirroring may be specified by traffic type (e.g., unicast, broadcast, multicast, and/or other traffic types).

Network virtualizations such as VXLAN or NVGRE may be used to create network overlays using encapsulation or tunneling protocols. In some cases, network overlays may increase the processing applied to identify virtual entities. The tunnel identifier (e.g. VXLAN virtual network identifier (VNI)) and/or the outer DMAC may be included in virtual entity assignments. To insert such identifiers, the CFA may support header editing capabilities, decapsulation (e.g., removing tunnel headers), and/or VLAN tag updates.

The CFA allows traffic to be steered to specific destination virtual entities in the receive path. The CFA may support packet steering based on a specific network virtualization mechanisms or tunnel types as well as fields from tunnel headers and inner headers. The CFA may support NVGRE, VXLAN, Geneve, and IP-in-IP tunneling protocols for network-overlay aware packet steering.

Partitioning and SR-IOV extend virtualization beyond the multiple queues in the NIC by adding the virtualization applied for physical interfaces to the PCIe functions of the host system. Partitioning allows a physical network port to be partitioned into multiple logical partitions. The logical partitions can be used as logical network interfaces. The partitions may be assigned PCIe functions with their own configuration space and base address registers (BARs).

SR-IOV may be used by a VM to bypass the hypervisor and receive virtual functions from the NIC. In some cases, bypassing the hypervisor may reduce the latency when transmitting or receiving data over the network. For example, when the hypervisor is bypassed, the system may not necessarily copy the data between virtual machine address space and hypervisor address space. Further, in bypass situations, context switching between VM and hypervisor may not necessarily be performed when transmitting or receiving data over the network.

To bypass the hypervisor, the NIC 150 may support bridging across the multiple VMs. In various implementations, edge virtual bridging (EVB) as defined in the IEEE 802.1Qbg Standard for environments such as a server supporting multiple Virtual Machines (VMs) may be implemented by the NIC 150.

The CFA may apply receive multicast/unicast filtering for individual virtual entities via PCIe functionality. These filters identify virtual entities based on DMACs, VLAN fields, and/or other identifiers. The flow identification capability provided in the CFA may be used to direct flows to PCIe physical functions (PFs) or virtual functions (VFs).

The CFA may support EVB switching between PFs and VFs, forwarding of outgoing network traffic from PFs and VFs to appropriate network ports, and steering of incoming network traffic to appropriate PFs and VFs. The CFA may support one or more of the virtual ethernet bridging (VEB, e.g., local switching in the NIC) and virtual ethernet port aggregation (VEPA, e.g., switching in the adjacent switch) modes.

The CFA may support integrated switching functions define in the 802.1Qbg Standard. For example, the CFA may support connectivity between the physical port(s) directed toward the network and virtual entitles directed toward the host, where the virtual entities is associated with a VM or Hypervisor. Virtual entities may have one or more sets of transmit and receive rings associated with the virtual entity.

CFA flow processing may support EVB functionality including: loopback processing to send traffic between VMs; multicast replication to multiple VMs; source port knockout and mirroring.

The CFA may also support forwarding unicast frames based on one or more identifiers (e.g., Tunnel ID, DMAC, VLAN ID, or other identifier). In some cases, a tunnel ID may include an identifier determined using fields in an encapsulation header, e.g., NVGRE or VXLAN headers. In some cases, the CFA may send the multicast or unicast frames to a network port, VM, or an embedded processor.

Additionally or alternatively, the CFA may perform frame replication for multicast, broadcast and promiscuous modes. For example, the CFA may support a number of multicast groups where one or more identifiers (e.g., Tenant ID, DMAC, VLAN ID, or other identifier) identifies the multicast or broadcast group and where there is an associated group membership list forwarding frames to the group members. In another example, the CFA may forgo forwarding among uplinks (e.g., network ports).

The CFA may perform source pruning or knockout to provide support for filtering to prevent a multicast/broadcast frame from being sent back to the source.

The CFA may support mirroring of identified flows to a specific PF or VF. The mirroring may be performed on all traffic; traffic for a particular virtual port, traffic for a particular VLAN, traffic for particular tunnel, or virtually any identifiable traffic grouping.

In some implementations, the CFA may support packet editing (e.g., tunnel encapsulation or decapsulation; VLAN tag addition, exchange, or deletion; and/or other editing). Additionally or alternatively, the packet processing and editing capabilities may be used to perform anti-spoof checking.

Hypervisors may provide connectivity between VMs through a virtual switch function. In some cases, the virtual switching function may be satisfied by a layer 2 (L2) switch. Network processing may become more complex (e.g., VXLAN processing, NVGRE processing) as the VM population increases. The CPU load and associated processing latency for the virtual switching function may also grow. Correspondingly, the processing load associated with applying equivalent policies to both traffic flowing through the hypervisor and traffic bypassing the HV also increases with the VM population.

A NIC 150 executing a CFA may provide offload services to the hypervisor and/or virtual switch and apply a consistent policy to traffic that bypasses the hypervisor (e.g., via SR-IOV).

Figure 2:
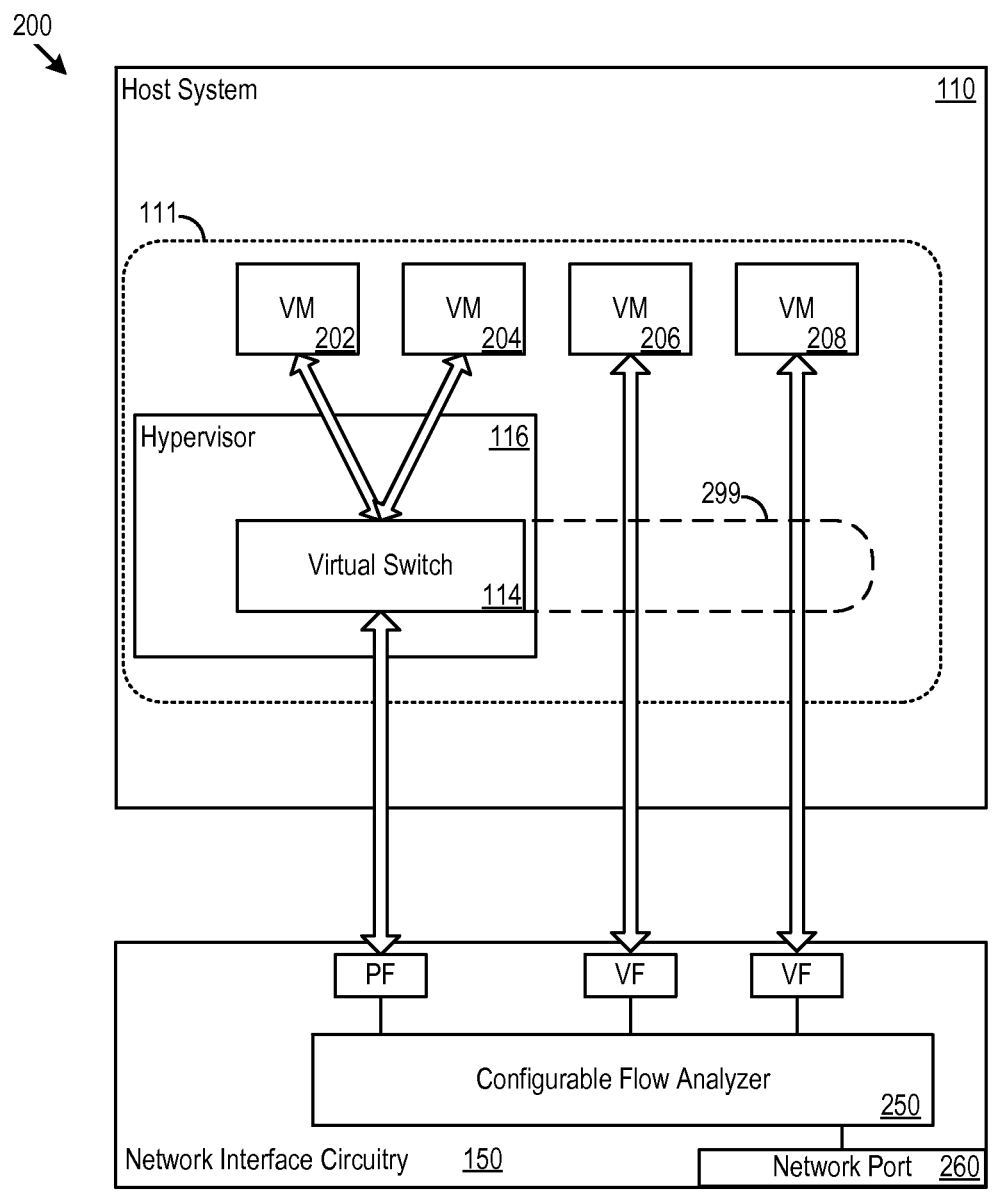
FIG. 2 shows an example VM environment.

FIG. 2 shows an example virtual machine environment 200. The NIC 150 may execute a CFA 250. VM 202, 204, 206, 208 may produce traffic that is handled by the hypervisor 116 and traffic that bypasses the hypervisor 116. The NIC 150 may provide VFs to traffic bypassing the hypervisor 116 and virtual switch 114. The NIC 150 may provide PFs to the hypervisor 116 and virtual switch 114, to support traffic handled by the hypervisor 116. The CFA 250 may perform flow processing and EVB operations on the traffic bypassing the hypervisor 116. The CFA may apply this processing between the PFs/VFs and the network port 260 of the NIC 150. The CFA may access flow control parameters and other network parameters from the virtual switch 114 of the hypervisor 116. Using consistent network parameters across the PFs and VFs may extend the effective management 299 of the hypervisor 116 to traffic that bypasses the hypervisor 116.

In some implementations, the virtual switch 114 may offload packet editing and monitoring functions to the CFA 250. Additionally or alternatively, the CFA may provide offloading support for tunnel encapsulation and decapsulation, Network Address Translation (NAT/NAPT), sampling, and/or other flow processing operations.

In some cases, the CFA 250 may implement flow processing and policy enforcement for the hypervisor 116. The virtual switch 114 of the hypervisor 116 may control policy that is applied to traffic frames in a virtual network. The virtual switch 114 may configure the CFA 250 state by adding or deleting flows and defining associated actions for offloaded flows. The CFA 250 may handle offloaded flows for which actions are defined. For the transmit path, the CFA may perform flow processing for offloaded flows (e.g., access control lists, or other flow identifiers) and aids in traffic management like shaping, metering, and scheduling. For the receive path, the CFA 250 may perform flow processing and fine grained steering to VMs 202, 204, 206, 208 or the virtual switch 114. The virtual switch may perform exception processing for special cases such as unknown flows and/or unsupported keys. The CFA may also support execution of Software Defined Networking (SDN) policies.

Figure 3:
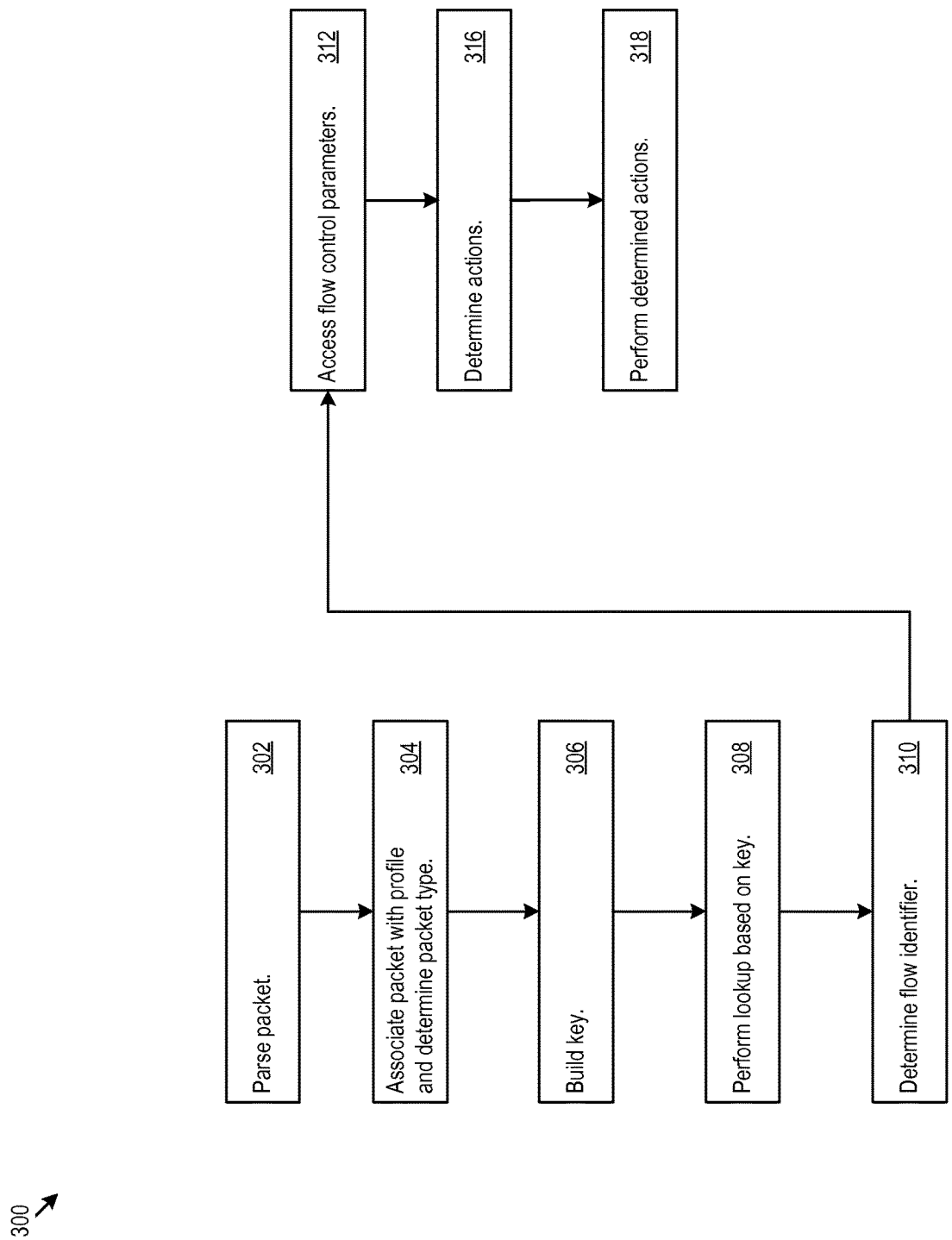
FIG. 3 show example network flow processing logic.

FIG. 3 show example flow processing logic 300 which may be implemented via an NIC 150 as a portion of the CFA 250. The flow processing logic 300 may parse a packet in a flow (302). For example, the flow processing logic may identify key fields in the packet header and associated metadata. The flow processing logic 300 may associate the packet with a profile and determine the packet type based on the header stack (304). Based on the profile, the flow processing logic 300 determines the fields used to identify flows of that type and build a key (306). The flow processing logic may perform a lookup using the key (308). Based on a lookup entry matching the key, the flow processing logic 300 may determine a flow ID for the packet (310). The flow processing logic 300 may access flow configuration and management parameters (312). For example, the flow processing logic 300 may query the virtual switch 114 for a listing of actions associated with flow IDs. In another example, the flow processing logic may access a locally stored listing on the NIC from a previous query or a listing previously sent from the virtual switch. The flow processing logic may determine one or more actions to perform on the packet based on the flow ID (316). For example, the actions may include an editing action or a monitoring function. The flow processing logic 300 may perform the determined actions (318).

The CFA, via the flow processing logic 300, may identify a flow based on an exact match (EM) and/or a wild card match (WM). The CFA may implement pre-defined key formats that can be used for flexible key selection. For example, TCP/IPv4 (Transmission control protocol/Internet Protocol version 4) traffic may use source IP address, destination IP address, destination TCP port, and source TCP port to identify a TCP flow. The CFA may support separate flow tables for transmit and receive directions. However, the tables may overlap in content and/or be combined. In addition to flow identification, source property checks can be applied to flows on the transmit path.

To identify a flow, a packet may be assigned a profile after parsing. The profile determines the fields that are used to identify the flow. The key(s) are built based on the profile. Separate keys may be built for the WM and EM tables since these tables may support different key sizes. The key lookup is performed may be both or either of the WM and EM tables. The WM table may be implemented using on-chip memory and/or memory registers. The WM table may also be implemented using wild card matching circuitry within the NIC. The EM table may be implemented using on-chip or EM circuitry. In cases where, both EM and WM lookups are performed the lookups are reconciled after the matches are made. For example, if the EM and WM lookups produce the same or consistent results, the flow may be selected based on the more specific result or if the results are the same, either result may be selected. For example, a default selection may be identified. If the results are inconsistent, a reconciliation action may be implemented. For example, the result (either the EM or WM) with the higher priority may be used.

In some systems, flow monitoring provides an operator with status information on network traffic and observations for operation-initiated or automated responses. Counters may be used by the CFA to monitor packet level and byte level statistics of flows. A counter may be implemented as a packet counter or a byte counter or a mix of packet and byte counters. Flows may be associated with an implicit counter tied to the flow, or an explicit counter that can be associated with the flow, or not associated with a counter. In some scenarios, the CFA may support counters that are aggregated from multiple flows. For example, a counter may act as an aggregate counter for flows between a given source and destination VM pair, an aggregate counter for any number of TCP flows for a virtual machine, and/or another aggregated counter type.

Mirroring may be used to analyze traffic flows. Virtually any flow may be mirrored. When the mirroring is active for a flow, one or more mirror destinations may be specified. When a flow is designated for mirroring, packets matching that flow entry may be copied to the mirror destination(s).

Meters may be used to measure and analyze rate of flows. The CFA may support any number of flow meters, in some implementations in excess of 1000. For example, a flow meter may be implemented using the two-rate, three color marking algorithm described in RFC4115 (Aboul-Magd, et al. "A Differentiated Service Two-Rate, Three-Color Maker with Efficient Handling of in-Profile Traffic", July 2005). In addition to flow meters, the CFA may support metering of interfaces (physical and virtual functions). Interface meters and flow meters may be used in conjunction and/or separately.

The CFA may also support a sampling feature. Sampling may be used to sample of individual flows based on a sampling period or sampling algorithm. The sampled packets can be copied to a destination virtual entity. The destination virtual entity for sampled packets may be designated per SR-IOV stream, flow, and/or other sampling entity.

In some implementations, the CFA may mark packets within a flow for tracking. For example, when the "Hit" action is active for a given flow, the CFA may set a "Hit" bit or bits for a flow when a packet from the flow is matched. The "Hit" marker may then be cleared by the CFA after performing a designated monitoring or processing action. Additionally or alternatively, the "Hit" marker may be cleared by another application (e.g., an application running on the host, VM, destination machine, hypervisor, or other execution environment) when an action is performed or other response to the marker is executed.

The CFA may track flow states and identify and/or assign ages to the flows. The flow states can be tracked on per flow basis. For example, TCP/UDP (User Datagram Protocol) flow states can be tracked for established flows, TCP flows on which a TCP FIN (Finished) bit was detected, and/or other flows.

The CFA may support packet editing in response to flow matching or other identifiers. For example, the CFA may perform VLAN tag insertion or deletion. Flows and/or individual packets may be designated for VLAN editing. The inserted (or stripped) VLAN tag may be provided in a packet buffer descriptor when the VLAN edits are designated for individual packets. The CFA may support VLAN tagging schemes including 802.1Q, double VLAN tagging, or other VLAN tagging schemes.

For network overlays and tunneling, the CFA provides support for encapsulation and/or de-capsulation of specific tunnels. Encapsulation and de-capsulation actions for a specific tunneling mechanism may be specified for individual flows. The CFA support may support IP-in-IP, NVGRE, VXLAN, Geneve, GRE, and multiple-protocol label switching (MPLS), and/or network overlay schemes. The VLAN PRI (priority) field may be remapped through the use of VLAN tag encapsulation processing. For example, a PRI field remapping may be applied to the outermost VLAN tag after VLAN insertions/encapsulations are complete.

The network address translation (NAT) and network address and port translation (NAPT) may be supported by the CFA. The NAT/NAPT action may be designated for individual flows. Source IP address NAT, destination IP address NAT, source IP address and TCP port NAPT, destination IP address and TCP port NAPT, and/or other NAT/NAPT actions may be supported by the CFA.

The CFA perform time-to-live (TTL) checks on a flow. In addition to performing TTL checks, TTL decrements may be initiated for individual flow table entries. TTL checks may be combined with conditional processing performed on flows responsive to the TTL check.

The CFA may support a drop packet action that may be used to drop a packet matching a specific flow entry or other identification criteria. This packet editing action may be independent from other packet editing actions that are specified for the flow entry (e.g., activating a drop packet action may not necessarily affect other processing). When the drop packet action is active for a given flow entry, packets matching that flow entry may be dropped.

When one or more packet editing actions are specified for a given flow, a default action order may be enforced. The default order may be specified by a system operator, predetermined based on network parameters, and/or specified via other instructions. In an example scenario, a default or may be: VLAN editing specified in packet descriptors, decapsulation actions, other VLAN editing, TTL verification/update, NAT/NAPT, followed by encapsulation actions.

The CFA may perform functions for tunneled and non-tunneled traffic simultaneously. The monitoring and action functions of the CFA may be specified for individual flows, individual packets, multiple flows, and multiple packets. In some implementations, the CFA may operate on transmitted and received traffic.

Additionally or alternatively, CFA monitoring and actions may be attached to VMs and/or other virtual entities. In some cases, monitoring and action designations may be associated with specific PFs or VFs.

Figure 4:
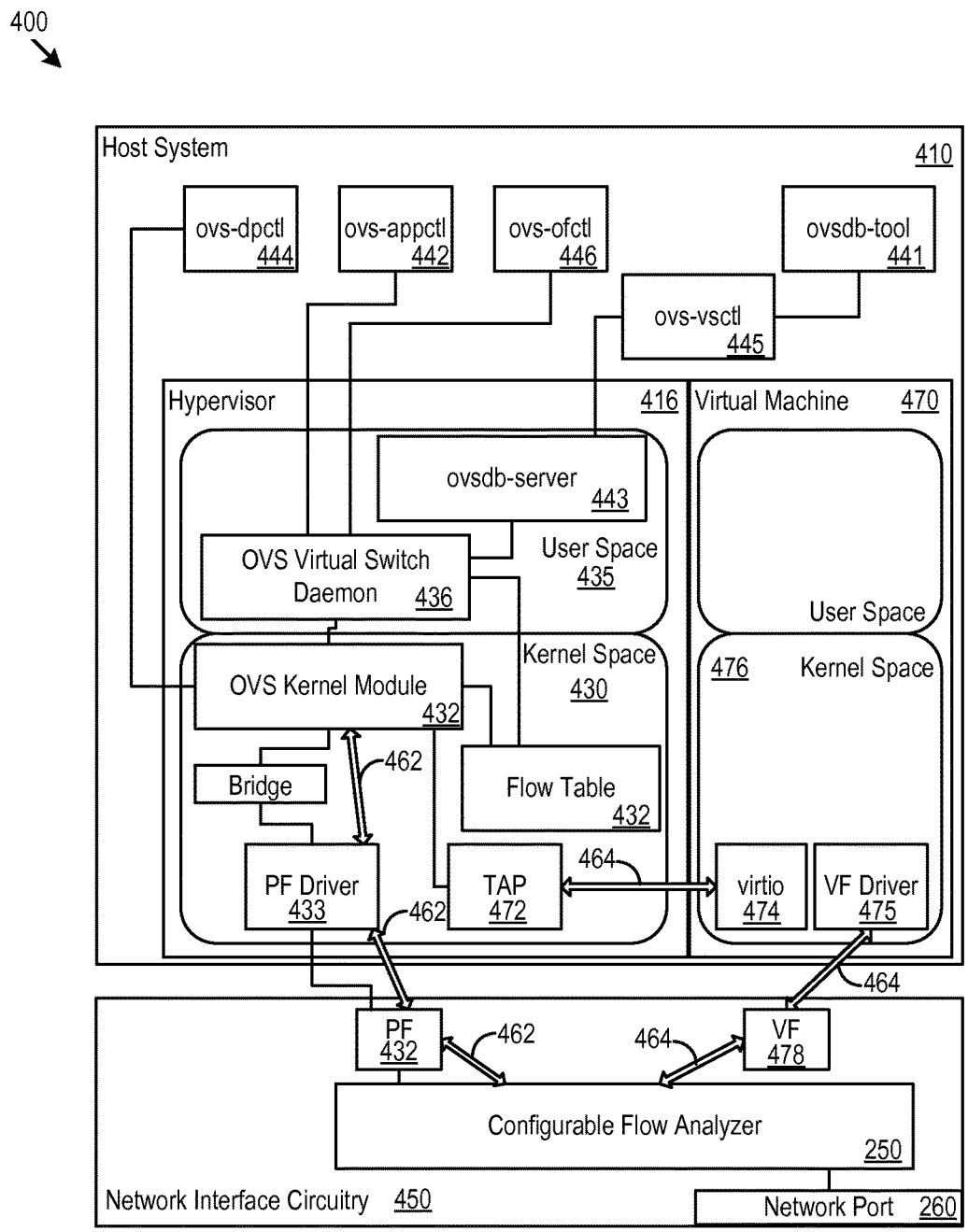
FIG. 4 shows an example OpenFlow Virtual Switch (OVS) offload architecture.

In some implementations, the CFA may support offload functions for OpenFlow virtual switches (OVS). FIG. 4 shows an example OVS offload architecture 400. The OVS kernel module 432 may be executed within the kernel space 430 of the hypervisor 416 running on the host system 410. However, in various implementations, the OVS kernel module 432 may be executed within the OS kernel of the host system. The OVS kernel module 432 may access a flow table maintained in the kernel space 430 to identify flows. The OVS kernel module 432 may use one or more of the identifiers discussed above to identify flows. The OVS kernel module 432 may implement WM and/or EM searches to identify the flows. The OVS kernel module may be in data communication with an OVS virtual switch daemon 436 being executed in the user space 435 of the hypervisor 416. The OVS virtual switch daemon 436 may interact with various tools and libraries such as the OVS database tool (ovsdb-tool) 441, the OVS application control (ovs-appctl) 442, the OVS database server (ovsdb-server) 443, OVS data path control (ovs-dpctl) 444, the OVS virtual switch control (ovs-vsctl) 445, the OVS command line tool (ovs-ofctl) 446, and/or other applications. The OVS virtual switch daemon 436 may be used to manage the OVS kernel module 432.

The OVS command line tool 446 may be used to control the OVS virtual switch operation. The OVS data path control 444 may be used manage and monitor OVS kernel module 432 operations for the OVS virtual switch. The OVS virtual switch control 445 and the OVS database tool 441 may be used to manage database interaction for the OVS virtual switch. The OVS application control 442 may be used for runtime management of the OVS virtual switch and OVS virtual switch daemons 436.

In various implementations, a NIC 450 running a CFA 250 may offload flow identification and flow processing operation from the OVS kernel module 432 and the OVS virtual switch daemon 436. The CFA 250 may be coupled to two offload paths 462, 464. The PF offload path 462 may be run parallel to the PF interface between the NIC 450 and the host system 110. The PF offload path may run from the OVS kernel module 432 through the PF driver 433 and the PF 432. The VF offload path 464 may travel from the OVS kernel module 432 through a TAP interface 472 to a virtual serial interface 474 in the kernel space 476 of the VM 470. The VF offload path may then extend to the NIC 450 via the VF driver 475 and the VF 478 provided by the NIC 450. In various implementations, the CFA 250 may access the flow tables and flow control parameters in the hypervisor kernel space via the PF offload path. The CFA 250 may apply the flow configuration and management parameters received on the PF offload path to VF offload operations that bypass the hypervisor using the tap interface. However, lookup actions and flow configuration and management parameter access may be implemented over the VF offload path 464. Therefore, in some cases, the VF offload path 464 may operate independently of the PF offload path 462.

Figure 5:
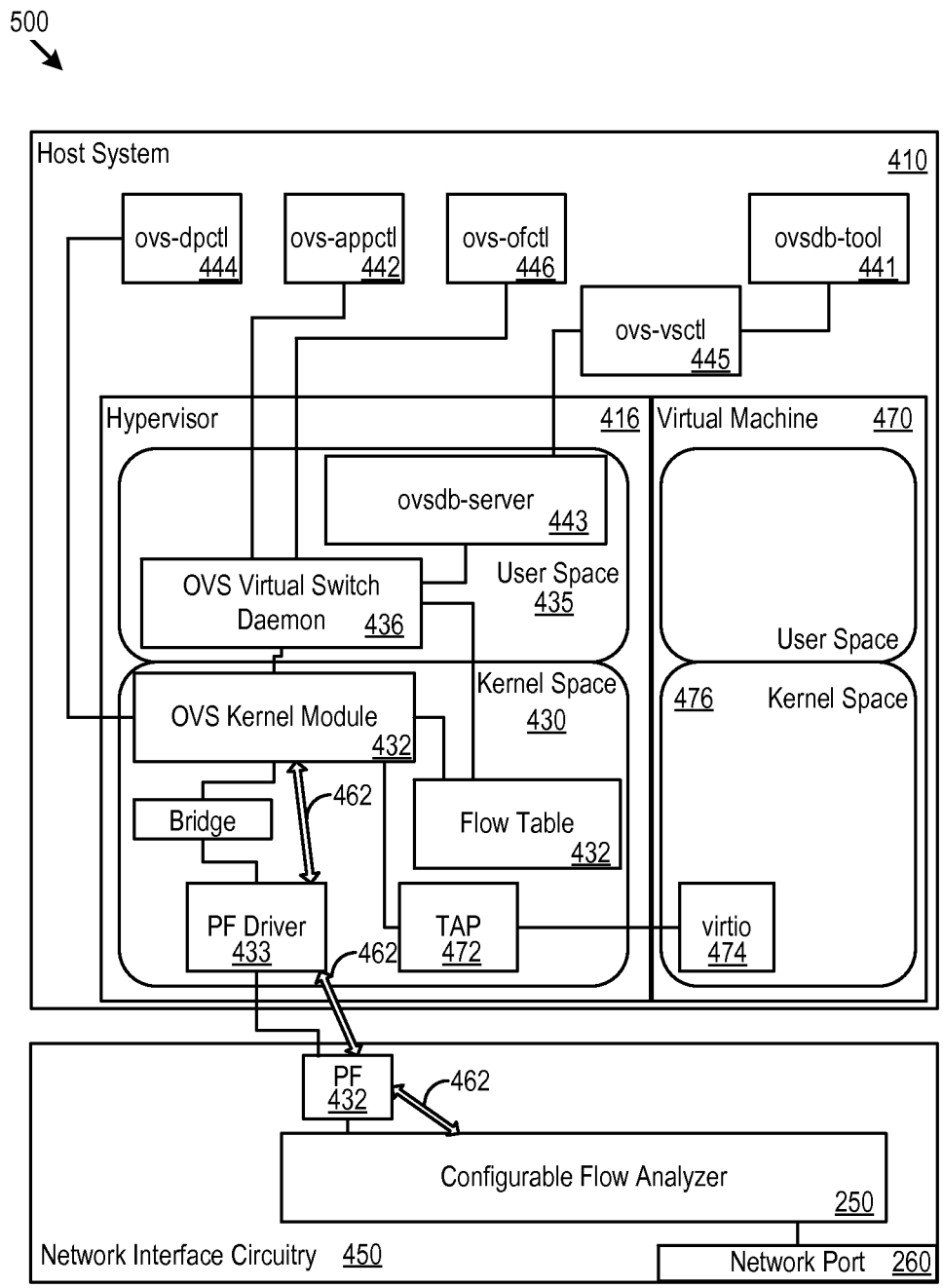
FIG. 5 shows another example OVS offload architecture.

FIG. 5 shows another example OVS offload architecture 500. In the example OVS offload architecture 500, the VMs do not bypass the hypervisor 416. Thus, the NIC 450 does not provide VFs to VMs and no VF offload path is present. In the example OVS offloading architecture 500 the offloaded functions and parameters are passed to the CFA 250 of the NIC 450 via the PF offload path 462. The CFA 250 may perform offloading operations with or without VM bypassing the hypervisor 416.

Figure 6:
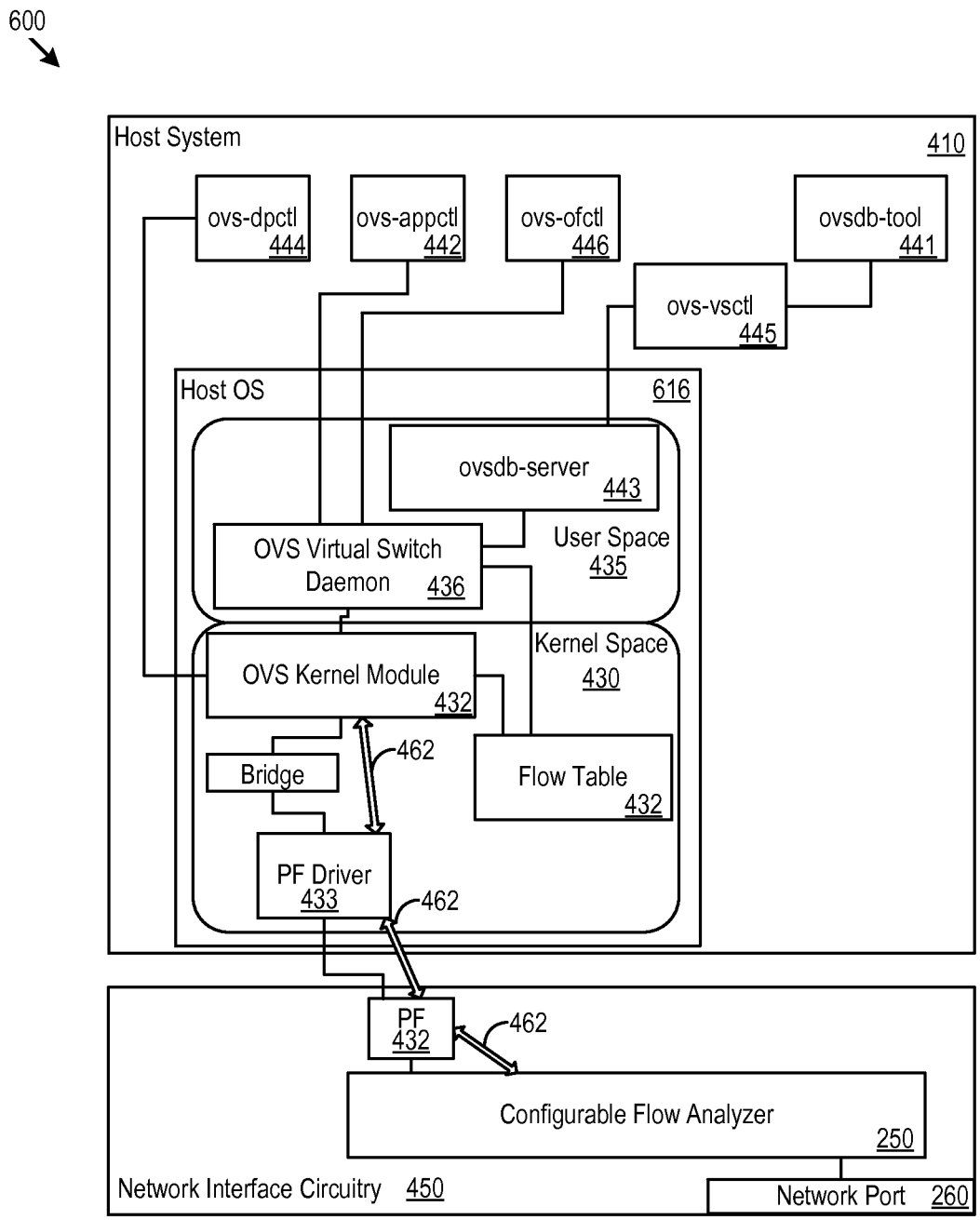
FIG. 6 shows another example OVS offload architecture.

FIG. 6 shows another example OVS offload architecture 600. In the example, architecture, the OVS kernel is executing in an OS kernel space 630. The host OS 616 may not necessarily manage any VM networking resources. The NIC 450 may supply PFs 460 to the host OS 616. In the example OVS offloading architecture 600 the offloaded functions and parameters are passed to the CFA 250 of the NIC 450 via the PF offload path 462. The CFA 250 may perform offloading functions for a OVS kernel module or user space library The CFA may perform offload functions for virtualized and non-virtualized environments.

Figure 7:
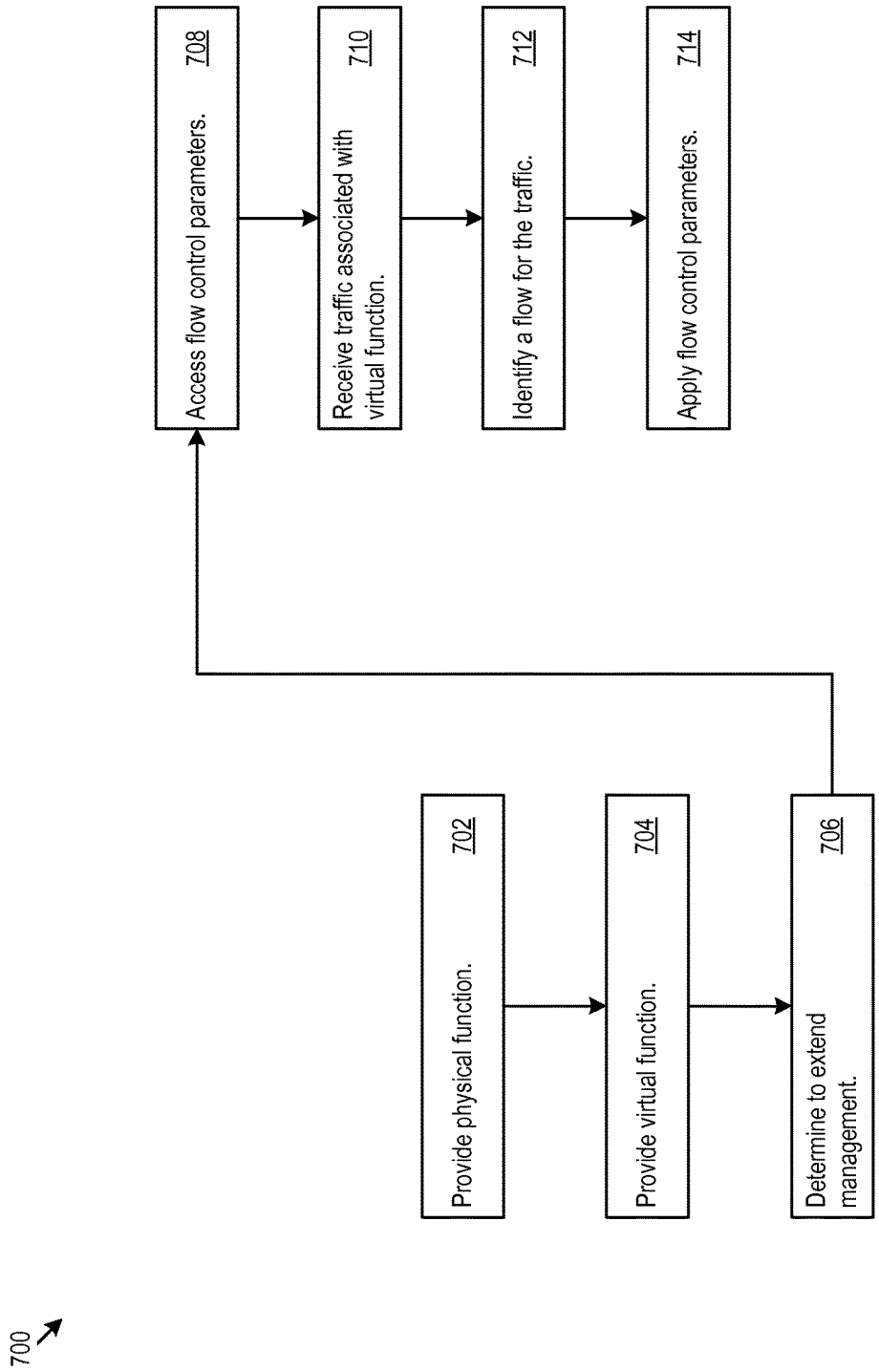
FIG. 7 shows example configurable flow analyzer (CFA) logic.

FIG. 7 shows example CFA logic 700, which may be implemented using NIC. The CFA logic 700 may provide a physical function to a virtual switch (702). For example, the CFA logic 700 may allow read/write memory access to a network port receive/transmit buffer to facilitate provision of network access or network resources. The physical function may be provided in accord with an internal system bus protocol such as PCIe. In various implementations, the virtual switch may use the physical function to provide network connectivity to virtual machines with traffic handled by the virtual switch. The CFA logic 700 may provide a virtual function to a virtual machine (704). The virtual function may be provided in accord with a bypass protocol such as SR-IOV. The CFA logic 700 may determine to extend management by the virtual switch to virtual machines receiving virtual functions from the CFA logic 700 (706). Responsive to the determination, the CFA logic 700 may access flow configuration and management parameters maintained by the virtual switch to support extension of the management of the virtual switch (708). The CFA logic 700 may receive traffic associated with the virtual function (710). The CFA logic 700 may identify a flow for the traffic (712). For example, the CFA logic 700 may apply the flow processing logic 300 to determine a flow ID for the traffic. Once the flow is identified, the CFA logic 700, may apply the flow configuration and management parameters in accord with the flow ID (714).

Figure 8:
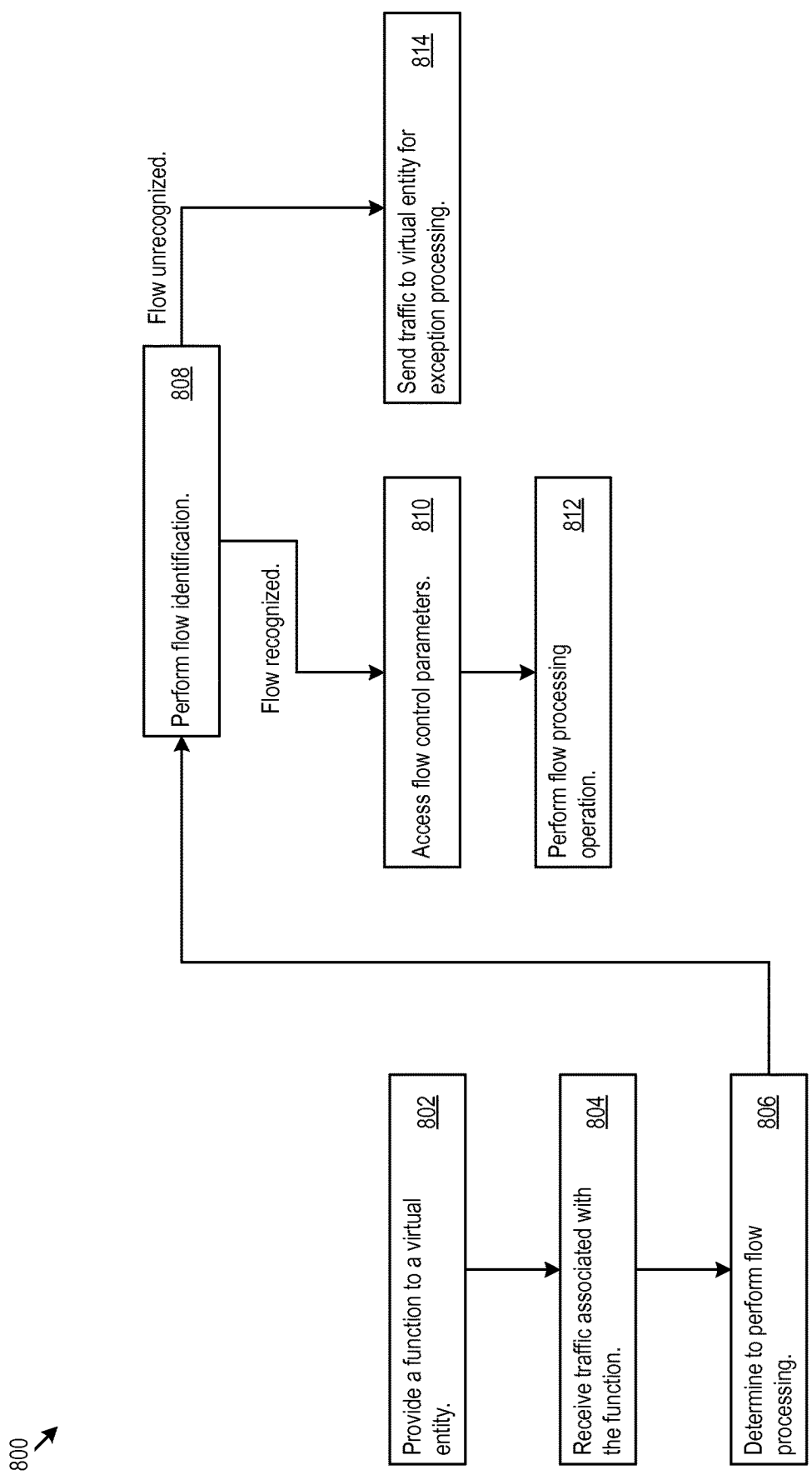
FIG. 8 shows example CFA offload logic.

FIG. 8 shows example CFA offload logic 800, which may be implemented using NIC. The CFA offload logic 800 may provide a function to a virtual entity (802). For example, the CFA offload logic 800 may provide a physical function to a hypervisor or virtual switch or provide a virtual function to virtual machine. The CFA offload logic 800 may receive traffic associated with the function via a network port (804). The CFA offload logic 800 may determine to perform flow processing on the traffic to reduce the processing logic of the host system of the virtual entity (806). Responsive to the determination, the CFA offload logic 800 may perform flow identification on the traffic (808). For example, CFA offload logic 800 may apply the flow processing logic 300 to determine a flow ID for the traffic. If the flow ID is recognized, the CFA offload logic 800 may access flow configuration and management parameters for the flow ID (810). The CFA offload logic 800 may perform a flow processing operation in accord with the accessed flow control parameters (812). If the flow ID is unrecognized, the CFA offload logic 800 may send the traffic to the virtual entity for exception processing (814). For example, the CFA offload logic 800 may send the traffic to a virtual switch or hypervisor for exception processing when a flow ID is not recognized.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, graphics processing units, audio processing units, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system, comprising:
 a host system having a processor and a memory, the host system configured to instantiate a virtual switch, a first virtual machine and a second virtual machine; and
 network interface circuitry in data communication with the host system, the network interface circuitry having a network port and configured to perform flow processing operations and to switch traffic between a physical function interface and a virtual function interface in accordance with a flow identifier (ID) for the traffic by:
   providing, to the virtual switch of the host system, access to the network port through the physical function interface of the network interface circuitry;
   providing, to the first virtual machine of the host system, access to the network port through the virtual function interface to bypass the virtual switch, wherein the first virtual machine is configured to bypass the virtual switch to access the network port;
   generating a flow key from data within a header of a packet associated with the first virtual machine;
   performing a lookup process using the flow key to determine the flow ID for the packet;
   receiving flow management parameters for the network port from the virtual switch via an offload path that is parallel to the physical function interface between the network interface circuitry and the host system, wherein the flow management parameters are associated with the flow ID and the flow management parameters indicate a flow action to be performed; and
   applying the flow management parameters to the packet, by performing the flow action prior to transmission via the network port, to extend a management domain of the virtual switch to the virtual function interface, wherein
 the lookup process is performed using an exact match lookup table in a case that the flow key is of a first format,
 the lookup process is performed using a wild card lookup table in a case that the flow key is of a second format different from the first format, the second virtual machine is configured to access the network port through the virtual switch without having a direct connection to the network interface circuitry, and the network interface circuitry is further configured to apply the flow management parameters to traffic associated with the second virtual machine received through the network port.

2. The system of claim 1, wherein the virtual function interface bypasses a hypervisor configured to manage the virtual switch.

3. The system of claim 1, wherein the flow action comprises incrementing a counter, mirroring a flow, metering a flow rate, sampling a flow, aging a flow, changing a virtual local area network tag, encapsulation, decapsulation, performing a logic check, network address translation, dropping the packet, or any combination thereof.

4. The system of claim 1, wherein the flow management parameters are for incoming network traffic, outgoing network traffic, or any combination thereof.

5. The system of claim 1, wherein the network interface circuitry is configured to receive the flow management parameters from a kernel space of a hypervisor of the virtual switch via the offload path.

6. A method, implemented by network interface circuitry that has a network port, the network interface circuitry being in data communication with a host system that is configured to instantiate a virtual switch, a first virtual machine and a second virtual machine, the method comprising:

performing flow processing operations, and switching traffic between a physical function interface and a virtual function interface in accordance with a flow identifier (ID) for the traffic by:
providing, to the virtual switch of the host system, access to the network port through the physical function interface of the network interface circuitry;
providing, to the first virtual machine of the host system, access to the network port through the virtual function interface to bypass the virtual switch, wherein the first virtual machine is configured to bypass the virtual switch to access the network port;
generating a flow key from data within a header of a packet associated with the first virtual machine;
performing a lookup process using the flow key to determine the flow ID for the packet;
receiving flow management parameters for the network port from the virtual switch via an offload path that is parallel to the physical function interface between the network interface circuitry and the host system, wherein the flow management parameters are associated with the flow ID and the flow management parameters indicate a flow action to be performed; and
applying the flow management parameters to the packet, by performing the flow action prior to transmission via the network port, to extend a management domain of the virtual switch to the virtual function interface, wherein the lookup process is performed using an exact match lookup table in a case that the flow key is of a first format, the lookup process is performed using a wild card lookup table in a case that the flow key is of a second format different from the first format, the second virtual machine is configured to access the network port through the virtual switch without having a direct connection to the network interface circuitry, and the applying further includes applying the flow management parameters to traffic associated with the second virtual machine received through the network port.

7. The method of claim 6, wherein the flow processing function comprises a flow processing function for the virtual function interface and the virtual function interface comprises a child function of the physical function.

8. The method of claim 6, wherein the flow processing function comprises incrementing a counter, mirroring a flow, metering a flow rate, sampling a flow, aging a flow, changing a virtual local area network tag, encapsulation, decapsulation, performing a transistor-transistor logic check, network address translation, dropping a packet, or any combination thereof.

9. The method of claim 6, wherein receiving the flow management parameters comprises receiving the flow management parameters from a kernel space of a hypervisor of the virtual switch via the offload path.

10. A product, comprising:
a non-transitory machine-readable medium; and
instructions stored on the non-transitory machine-readable medium, the instructions configured to, when executed by network interface circuitry that has a network port, the network interface circuitry being in data communication with a host system that is configured to instantiate a virtual switch, a first virtual machine and a second virtual machine, cause the network interface circuitry to perform a method comprising:

performing flow processing operations, and switching traffic between a physical function interface and a virtual function interface in accordance with a flow identifier (ID) for the traffic by:
providing, to the virtual switch of the host system, access to the network port through the physical function interface of the network interface circuitry;
providing, to the first virtual machine of the host system, access to the network port through the virtual function interface to bypass the virtual switch, wherein the first virtual machine is configured to bypass the virtual switch to access the network port;
generating a flow key from data within a header of a packet associated with the first virtual machine;
performing a lookup process using the flow key to determine the flow ID for the packet;
receiving flow management parameters for the network port from the virtual switch via an offload path that is parallel to the physical function interface between the network interface circuitry and the host system, wherein the flow management parameters are associated with the flow ID and the flow management parameters indicate a flow action to be performed; and
applying the flow management parameters to the packet, by performing the flow action prior to transmission via the network port, to extend a management domain of the virtual switch to the virtual function interface, wherein the lookup process is performed using an exact match lookup table in a case that the flow key is of a first format, the lookup process is performed using a wild card lookup table in a case that the flow key is of a second format different from the first format, the second virtual machine is configured to access the network port through the virtual switch without having a direct connection to the network interface circuitry, and the applying further includes applying the flow management parameters to traffic associated with the second virtual machine received through the network port.

11. The product of claim 10, wherein receiving the flow management parameters comprises receiving the flow management parameters from a kernel space of a hypervisor of the virtual switch via the offload path.

\* \* \* \* \*